US008812790B2

(12) United States Patent
Pruthi

(10) Patent No.: US 8,812,790 B2
(45) Date of Patent: *Aug. 19, 2014

(54) CACHING BASED ON SPATIAL DISTRIBUTION OF ACCESSES TO DATA STORAGE DEVICES

(71) Applicant: Marvell International Ltd., Hamilton (BM)

(72) Inventor: Arvind Pruthi, Los Gatos, CA (US)

(73) Assignee: Marvell World Trade Ltd., St. Michael (BB)

( * ) Notice: Subject to any disclaimer, the term of this patent is extended or adjusted under 35 U.S.C. 154(b) by 0 days.

This patent is subject to a terminal disclaimer.

(21) Appl. No.: 14/028,085

(22) Filed: Sep. 16, 2013

(65) Prior Publication Data

US 2014/0089597 A1    Mar. 27, 2014

Related U.S. Application Data

(63) Continuation of application No. 13/033,569, filed on Feb. 23, 2011, now Pat. No. 8,539,162.

(60) Provisional application No. 61/307,789, filed on Feb. 24, 2010.

(51) Int. Cl.
*G06F 12/00* (2006.01)

(52) U.S. Cl.
USPC .................. 711/133; 711/137; 711/E12.057

(58) Field of Classification Search
None
See application file for complete search history.

(56) References Cited

U.S. PATENT DOCUMENTS

| 6,529,998 | B1 | 3/2003 | Yochai et al. |
| 2007/0276993 | A1 | 11/2007 | Hiratsuka |
| 2008/0288751 | A1 | 11/2008 | Kocev |

FOREIGN PATENT DOCUMENTS

| EP | 1280063 | 1/2003 |
| WO | 2007113757 | 10/2007 |

OTHER PUBLICATIONS

Pruthi, Arvind, Hotspot Detection and Caching for Storage Devices, U.S. Appl. No. 12/881,459, filed Sep. 14, 2010, to be published by USPTO.
Toader, Elena Lidia, Authorized Officer, European Patent Office, PCT International Appl. No. PCT/US2011/025962, International Filing Date Feb. 23, 2011, in International Search Report, mailed Jun. 17, 2011, 11 pages.
Baharlou, Simin, Authorized Officer, The International Bureau of WIPO, International App. No. PCT/US2011/025962, International Preliminary Report on Patentability, mailed Sep. 7, 2012, 8 pages.

*Primary Examiner* — Reginald Bragdon
*Assistant Examiner* — Baboucarr Faal

(57) ABSTRACT

A controller is communicatively coupled with a storage medium and with a cache device and configured to interface with a processor or a memory of a computer system. The controller is further configured to receive a specified quantity of address references associated with a storage system; determine a spatial distribution of references to addresses of the storage system based at least in part on the received specified quantity of the address references, where to perform a determination of the spatial distribution, the controller is further configured to omit a random quantity of address references between previous determination of the spatial distribution and said determination of the spatial distribution; combine the determined spatial distribution with the previous determination of the spatial distribution into a spatial locality metric of the storage system; and output the spatial locality metric to use in caching data from the storage medium to the cache device.

22 Claims, 10 Drawing Sheets

| Table 1 | Storage system |
|---|---|
| Spatial locality of storage system | Spatial locality metric 110 |

150 ⏋ (left label for bottom-left cell); 140 ⏋ (table label)

| Table 2 | | Storage system |
|---|---|---|
| Spatial locality of storage system | ⋮ | ⋮ |
| | Short range A1 | Short-range metric 112 |
| | Long range A2 | Long-range metric 114 |
| | ⋮ | ⋮ |

140

150

| Table 3 | Storage system | | | |
|---|---|---|---|---|
| | ... | Region "i" | Region "j" | ... |
| Spatial locality of storage system | ... | Metric of region "i" 120 | Metric of region "j" 130 | ... |

140

150

| Table 4 | | Storage system | | |
|---|---|---|---|---|
| | | ... | Region "i" | Region "j" | ... |
| Spatial locality of storage system | | ⋮ | ⋮ | ⋮ | ⋮ |
| | Short range A1 | ... | Short-range metric of region "i" 122 | Short-range metric of region "j" 132 | ... |
| | Long range A2 | ... | Long-range metric of region "i" 124 | Long-range metric of region "j" 134 | ... |
| | | ⋮ | ⋮ | ⋮ | ⋮ |

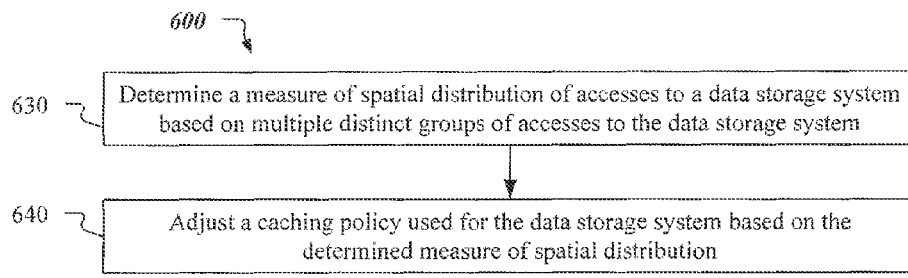
Fig. 6A
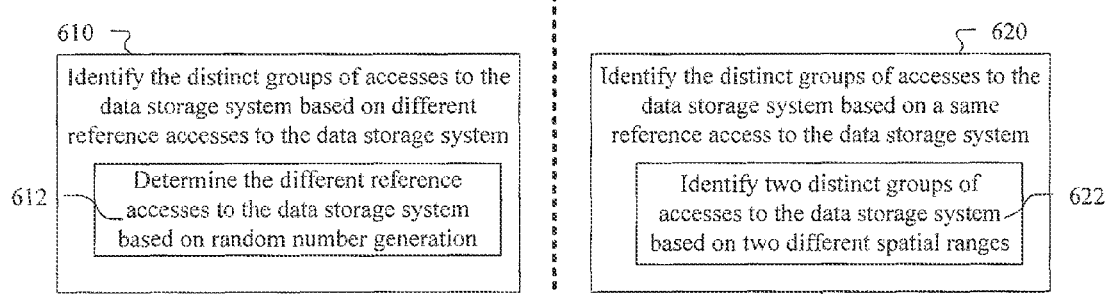
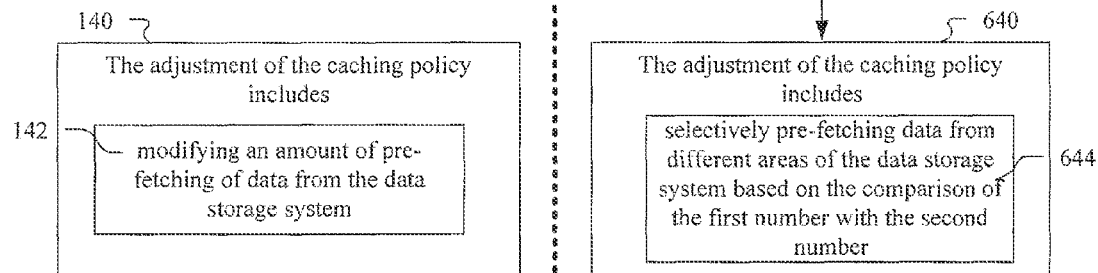
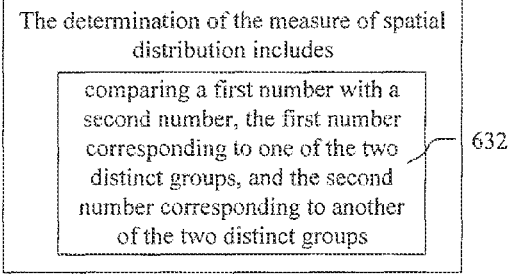
Fig. 6B
Fig. 6C
Fig. 6D

US 8,812,790 B2

CACHING BASED ON SPATIAL DISTRIBUTION OF ACCESSES TO DATA STORAGE DEVICES

CROSS-REFERENCE TO RELATED APPLICATIONS

This application is a continuation of U.S. patent application Ser. No. 13/033,569, filed Feb. 23, 2011, now issued as U.S. Pat. No. 8,539,162, which claims the benefit of U.S. Provisional Application No. 61/243,990, filed on Sep. 18, 2009. The disclosure of the above application is incorporated herein by reference in its entirety.

BACKGROUND

This specification relates to caching for storage devices based on spatial distribution of accesses to data storage devices.

Examples of storage devices include hard disk drives and optical disc drives. Storage devices typically store data in blocks on a rotating storage medium. Block sizes are often measured in kilobytes (KB). For example, the storage medium may include magnetic disks, optical discs, etc. Therefore, the storage devices typically have slower access times than semiconductor memory. As a result, data can be read faster from the semiconductor memory than from the storage medium.

Many storage devices include a semiconductor memory called cache memory to store data that is repeatedly requested by a host or that may be requested by the host. Such storage devices typically include a cache controller that controls caching of data to the cache memory. For example, when the host issues a read command, the cache controller first determines if the requested data is available in the cache memory. If not, a cache miss occurs, and the data is retrieved from the storage medium and is forwarded to the host. The cache controller may cache the data in the cache memory.

When the host requests the same data again, the data is found in the cache memory (i.e., a cache hit occurs) and is output to the host from the cache memory. The host receives the data faster from the cache memory than from the storage medium. Additionally, based on the data requested by the host, other related data may be cached in anticipation that the host may request the other related data. The size of the cache memory, however, is limited. Accordingly, the amount of data that can be cached is also limited. Therefore, the cache controller may selectively delete data from the cache memory. For example, data not requested by the host for a period of time may be deleted from the cache memory. Data may also be deleted when the host requests different data than the data stored in the cache memory. By selectively deleting data from the cache memory, data that is more likely to be used by the host can be cached.

SUMMARY

This specification describes technologies for quantifying a spatial distribution of accesses to storage systems and for determining spatial locality of references to storage addresses in the storage systems. An address, also referred to as a storage location, can be a physical address of a location on a specific storage device, or the address can be a logical address of a location into a virtual volume. A reference to an address on the storage system refers to accessing the storage system to perform a read operation or a write operation on the data stored at the accessed address. In general, the storage systems include individual storage devices (e.g., hard drives) as well as combinations of storage devices, e.g., redundant array of independent disks (RAID), network attached storage (NAS), storage area network (SAN). The spatial locality for the combination of storage devices can correspond to logical devices (also referred to as block devices) that span multiple physical drives.

In general, one aspect of the subject matter described in this specification can be implemented in methods performed by data processing apparatus that include the actions of determining a measure of spatial distribution of accesses to a data storage system based on multiple distinct groups of accesses to the data storage system. The methods further include adjusting a caching policy used for the data storage system based on the determined measure of spatial distribution.

These and other implementations can include one or more of the following features. The methods can include identifying the distinct groups of accesses to the data storage system based on different reference accesses to the data storage system. Identifying the distinct groups of accesses to the data storage system can include determining the different reference accesses to the data storage system based on random number generation. Adjusting the caching policy can include modifying an amount of pre-fetching of data from the data storage system.

The methods can also include identifying the distinct groups of accesses to the data storage system based on a same reference access to the data storage system. Identifying the distinct groups of accesses to the data storage system can include identifying two distinct groups of accesses to the data storage system based on two different spatial ranges. Further, determining the measure of spatial distribution can include comparing a first number with a second number. The first number can correspond to one of the two distinct groups, and the second number can correspond to another of the two distinct groups. Furthermore, adjusting the caching policy can include selectively pre-fetching data from different areas of the data storage system based on the comparison of the first number with the second number.

Other implementations of this aspect include corresponding systems, apparatus, and computer programs, configured to perform the actions of the methods, encoded on computer storage devices.

According to another aspect, the described subject master can also be implemented in a storage system including a storage medium, a cache device, and a controller that is communicatively coupled with the medium and with the cache device. The controller is configured to interface with a processor or a memory of a computer system. Further, the controller is configured to receive a specified quantity of address references associated with the storage system. The controller is also configured to determine a spatial distribution of references to addresses of the storage system based at least in part on the received specified quantity of the address references, and to combine the determined spatial distribution with a previously determined spatial distribution into a spatial locality metric of the storage system. Furthermore, the controller is configured to output the spatial locality metric to use its caching data from the storage medium to the cache device.

These and other implementations can include one or more of the following features. In some implementations, the cache device can include cache memory. In some implementations, the cache device further can include a device controller.

To perform a determination of the spatial distribution, the controller can be further configured to omit a random quantity of address references between previous determination of the spatial distribution and said determination of the spatial distribution. Also, the spatial locality metric can include a weighted sum of the determined spatial distribution and the previously determined spatial distribution. In addition, the controller can be further configured to receive a reference to an address of the storage system, such that the received address reference corresponds to a given block offset on the storage system. Additionally, the controller can be configured to detect a cache miss for the received address reference in the cache device, and to select, in response to the detection of the cache miss, data relating to the given block offset of the storage system for caching to the cache device in accordance with a current value of the spatial locality metric.

In some other implementations, the selected data for caching to the cache device can include: (i) a specified amount of data from contiguous memory adjacent to the given block offset if the current value of the spatial locality metric is between a first value and a second value larger than the first value; (ii) more than the specified amount of data from contiguous memory adjacent to the given block offset if the current value of the spatial locality metric is larger than the second value; and (iii) less than the specified amount of data from contiguous memory adjacent to the given block offset if the current value of the spatial locality metric is less than the first value. For example, the selected data for caching to the cache device is zero if the current value of the spatial locality metric is less than the first value. In another example, the selected data for caching to the cache device includes twice the specified amount of data from contiguous memory adjacent to the given block offset if the current value of the spatial locality metric is larger than the second value.

In some other implementations, the determined spatial distribution on the storage system can include a first fraction of the received specified quantity of the address references that are within a first distance from a block offset of a first address reference of the received specified quantity of the address references. Additionally, the determined spatial distribution on the storage system can further include a second fraction of the received specified quantity of the address references that are within a second distance from the block offset of the first address reference of the received specified quantity of the address references. The second distance is longer than the first distance, such that the determined spatial distribution has a short-range component of the spatial distribution representing a ratio of the first fraction to the first, shorter distance and a long-range component of the spatial distribution representing another ratio of the second fraction to the second, longer distance. The spatial locality metric can include short-range and long-range spatial locality metrics corresponding to respective short-range and long-range components of the spatial distribution. Further, the selected data for caching to the cache device can correspond (i) to addresses located less than the first distance from the given block offset if a current value of the short-range spatial locality metric is larger than a current value of the long-range spatial locality metric; (ii) to addresses located less than the second distance from the given block offset if current values of the short-range and long-range spatial locality metrics are substantially equal; and (iii) to addresses located between the second and first distances from the given block offset if a current value of the short-range spatial locality metric is smaller than a current value of the long-range spatial locality metric.

Other implementations of this aspect include corresponding systems, apparatus, and computer programs, configured to perform the actions of the methods, encoded on computer storage devices.

Particular implementations of the subject matter described in this specification can realize one or more of the following advantages. The systems and techniques disclosed in this specifications can be used to determine optimum amounts of data to be cached in accordance with current patterns of the spatial distribution of accesses to a storage system. Additionally, the described techniques can be used to identify areas of the storage system from which to pre-fetch data based on the current spatial locality patterns.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIGS. 6A-6D show aspects of an example of a method for adjusting a caching policy used for a data storage system based on a measure of spatial distribution of accesses to the data storage system.

Like reference numbers and designations in the various drawings indicate like elements.

DETAILED DESCRIPTION

Figures 1A, 1B:
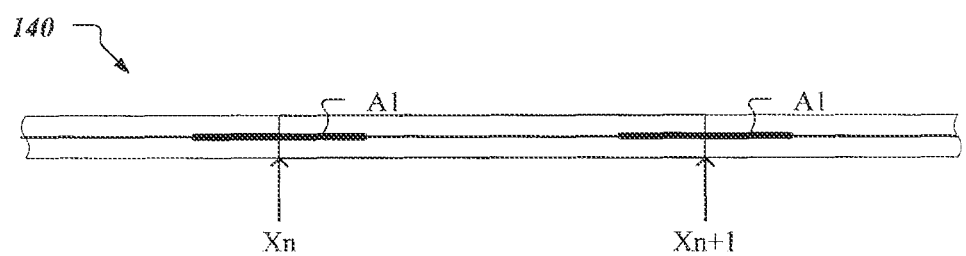
FIGS. 1A-1H show examples of spatial locality metrics corresponding to a storage system.

Caching for storage systems (e.g., individual storage devices, such as hard drives, or combinations of storage devices) by leveraging small but fast random access or solid-state (e.g., flash) memory has become especially popular. Most caching systems cache a block of data upon occurrence of a cache miss when a block is referenced by a host for access, but the referenced block cannot be found in cache memory. The host, however, may not need to use the cached block again. Consequently, caching blocks based solely on cache miss occurrences can result in populating the cache memory with blocks that might not be used again by the host, thus reducing the amount of cache memory available to cache other data that may be used repeatedly by the host. However, depending on applications running on the host (e.g., Microsoft Exchange, SQL Server, Oracle, etc.,) a virtual volume may experience temporal and/or spatial access patterns that can be specific to the respective applications. As such, caching promises benefits when there is reasonably high temporal and/or spatial locality of references to addresses on a storage system.

Temporal locality of references to addresses of a storage system refers to a number of addresses on the storage system that are referenced per unit time, or equivalently the temporal locality represents a rate of references to addresses on the storage system. Moreover, the temporal locality can be monitored for the storage system, or for one or more regions on the storage system, and a caching algorithm can be implemented based on the monitored rate of references to addresses on the storage system.

Spatial locality of references to addresses of a storage system refers to a number of addresses on the storage system that are referenced per unit address space, or equivalently the spatial locality represents a spatial-density of references to addresses on the storage system. For example, when a particular address of the storage system is referenced, the spatial locality provides the probability that nearby memory locations will be referenced in the future. Note that in this specification, the term spatial locality of reference to addresses of a storage system is used interchangeably with the term distribution of accesses to the storage system. Moreover, the spatial locality can be monitored for the storage system, or for one or more regions on the storage system, and a caching algorithm can be implemented based on the monitored spatial-density of references to addresses on the storage system. In this manner, the limited space provided by the cache memory can be optimally used to cache blocks of the storage system when the spatial locality is high, for instance.

Multiple representations of spatial distributions of accesses to the storage system are described below in this specification in connection with FIGS. 1A-1H. Further, various techniques for measuring spatial distributions of accesses to the storage systems are described below in connection with FIGS. 3 and 6A-6D. Furthermore, techniques for caching data stored on a storage system in accordance with measures of a spatial distribution of accesses to the storage system are described below in connection with FIGS. 4A-4B and 5A-5B. These techniques can be implemented in systems described below in connection with FIGS. 2A-2C.

Table 1 in FIG. 1A includes an example of a spatial locality metric 110 corresponding to a storage system 140. The spatial locality metric 110 is a measure of spatial distribution of accesses to the storage system 140 or equivalently a measure of a spatial locality 150 of the storage system. A value (also referred to as a sample) of the spatial locality 150 can be determined for a size "$A_1$" of address space on the storage system 140 by using a sequence of "m" references to addresses on the storage system 140. FIG. 1B illustrates a portion of the storage system 140 and a block offset "$X_n$" corresponding to a reference (READ/WRITE) operation used to determine the value of the spatial locality 150. As shown in FIG. 1B, the address space of size "$A_1$" spans an address interval centered on the block offset "$X_n$" from $(X_n - \frac{1}{2}A_1)$ to $(X_n + \frac{1}{2}A_1)$. A typical block size on the storage system 140 is 4 KB, while the size "$A_1$" can be 64 KB, 128 KB, 256 KB or 512 KB, for instance. In some implementations, the sequence of "m" references to addresses on the storage system 140 correspond to "m" consecutive operations following the reference operation corresponding to the block offset "$X_n$". The number "m" can be preset to a value of m=15, for example.

The value of the spatial locality 150 is initialized to 0 (zero). Subsequently, "m" determinations are made whether addresses corresponding to the sequence of "m" references are within a distance $\pm \frac{1}{2}A_1$ from the block offset "$X_n$" corresponding to the reference operation, and the value of the spatial locality 150 can be incremented by 1 (one) for each positive determination from among the "m" determinations. For example, the spatial locality 150 has an integer value of "k", where $0 \leq k \leq m$, if "k" references from among the sequence of "m" references correspond to addresses within an address space of size "$A_1$" centered on the block offset "$X_n$" corresponding to the reference operation. In another example, the spatial locality 150 is normalized and has a fractional value of "k/m", where $0 \leq k/m \leq 1$. The use of normalized values of the spatial locality 150 allows for comparing values of the spatial locality 150 that were determined using sequences having different numbers, e.g., "$m_1$", "$m_2$", ..., of references to addresses on the storage system 140, for instance. Other examples of "m"-values are 5, 10, 15, 20, 30, 50, 100, ..., etc. Additionally, note that the spatial locality 150 in the foregoing examples is dimensionless.

Once the value of the spatial locality 150 has been determined as described above, an instant value of the spatial locality metric 110 can be calculated as a weighted average between the determined value of the spatial locality 150 and a previously calculated value of the spatial locality metric. For example, the instant value of the spatial locality metric 110 can be calculated as $$S_{A1}(\text{instant}) = \beta \times s(A1, m; n) + (1-\beta) \times S_{A1}(\text{previous}) \quad (1).$$

The notations $S_{A1}(\text{instant})$ and $S_{A1}(\text{previous})$ represent respective instant and previous values of the spatial locality metric 110. The notation $s(A_1, m; n)$ represents the value of the spatial locality 150 determined for the size "$A_1$" of address space on the storage system 140 and using a sequence of "m" references following the operation corresponding to the block offset "$X_n$". The weight "$\beta$" represents a measure of the influence of spatial locality metric history in the calculation of the current value of the spatial locality metric 110.

In some implementations, the instant value of the spatial locality metric 110 can be heavily weighted towards the spatial locality metric history when the weight "$\beta$" has small values, e.g., $\beta < 0.15$. However, the spatial locality metric history can have a small influence on the instant value of the spatial locality metric 110 when the weight "$\beta$" has large values, e.g., $\beta > 0.85$. In the latter case, the major contribution to the instant value of the spatial locality metric 110 comes from the currently determined value of the spatial locality 150.

A subsequent value of the spatial locality 150 can be determined as described above, however, in reference to another operation corresponding to a block offset "$X_{n+1}$" and another sequence of "m" operations that follow the other reference operation. The other operation can be determined, e.g., based on time, based on a number of operations, or based on a random factor, as described below in this specification. The block offset "$X_{n+1}$" associated with the other reference operation is depicted in FIG. 1B. For instance, "m" determinations are made whether addresses corresponding to the other sequence of "m" references are within a distance $\pm \frac{1}{2}A_1$ from the block offset "$X_{n+1}$" corresponding to the other reference operation, and the value of the spatial locality 150 can be incremented by 1 (one) for each positive determination from among the "m" determinations. Further, a subsequent instant value $S_{A1}(\text{instant})$ of the spatial locality metric 110 is calculated in accordance with Equation (1) using the previously calculated instant value of the spatial locality metric 110 as the previous value $S_{A1}(\text{previous})$ of the spatial locality metric 110, and the value $s(A_1, m; n+1)$ of the spatial locality 150 determined for the size "A1" of address space on the storage system 140 in reference to the operation corresponding to the block offset "$X_{n+1}$".

As instant and previous values of the spatial locality metric 110 are related to each other and to the value of the spatial locality 150 in accordance with Equation (1), systematic errors in determining the foregoing quantities can propagate and affect the accuracy of the calculation in Equation (1). However, the accuracy of the calculation of spatial locality metric 110 can be increased by skipping random numbers of operations between consecutive determinations of the spatial locality 150 because the influence of artifacts that have a periodic nature is reduced in this manner. Accordingly, a random number "r" of operations can be skipped after the last "$m^{th}$" operation in the sequence of "m" operations associated with the reference operation corresponding to the block offset "$X_n$," and prior to the other reference operation corresponding to the block offset "$X_{n+1}$". The random number "r" can be generated between 0 and "N", where "N" represents a maximum number of operations that can be skipped between consecutive determinations of the value of the spatial locality 150. The number "N" can be preset to a value of N=10, for example. In some implementations, the number of operations to skip between consecutive reference operations can be determined based on time intervals. For example, the operations to be skipped can occur during time intervals having a value that can be preset in software/firmware. In another example, the operations to be skipped can occur during time intervals having values generated randomly between minimum and maximum time intervals that can be preset in software/firmware. In the latter case, the minimum and maximum time intervals can be preset in software/firmware.

As described above in connection with FIGS. 1A and 1B, the spatial locality 150 represents a spatial-density of references to addresses on the storage system 140 determined for a memory size "$A_1$". However, multiple spatial-densities of references to addresses can be monitored for the storage system 140 by determining components of the spatial locality 150 for multiple, different memory sizes "$A_1$", "$A_2$", "$A_3$", . . . , respectively. For example, the different memory sizes can be chosen to satisfy the following inequalities $A_1 < A_2 < A_3$, corresponding to short, medium and long range components of the spatial locality 150 (e.g., an $A_1$ value can be 64 KB, an $A_2$ value can be 128 KB, an $A_3$ value can be 256 KB, and an $A_4$ value can be 512 KB).

Figures 1C, 1D:
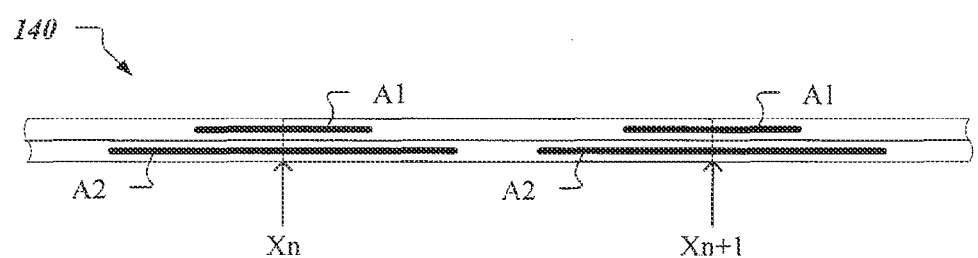

Table 2 in FIG. 1C includes examples of spatial locality metrics 112 and 114 corresponding to the storage system 140. A short-range spatial locality metric 112 is associated with a short-range component or the spatial locality 150, and a long-range spatial locality metric 114 is associated with a long-range component of the spatial locality 150. The short-range component of the spatial locality 150 is determined for a memory size "$A_1$", and the long range component of the spatial locality 150 is determined for a memory size "$A_2$" larger than the memory size "$A_1$", i.e., $A_1 < A_2$, similarly to the above disclosure in connection with FIGS. 1A-1B. For example, values of the short-range and long-range components of the spatial locality 150 can be determined using a sequence of "m" references to addresses on the storage system 140. FIG. 1D illustrates a portion of the storage system 140 and a block offset "$X_n$" corresponding to a reference operation used to determine the values of the short-range and long-range components of the spatial locality 150 for the respective sizes "$A_1$" and "$A_2$" of address space on the storage system 140. As shown in FIG. 1D, an address space having the smaller size "$A_1$" spans a portion of the storage system 140 centered on the block offset "$X_n$" from $(X_n - \frac{1}{2}A_1)$ to $(X_n + \frac{1}{2}A_1)$, and another address space having the larger size "$A_2$" spans another portion of the storage system 140 centered on the block offset "$X_n$" from $(X_n - \frac{1}{2}A_2)$ to $(X_n + \frac{1}{2}A_2)$. The size "$A_1$" can be 64 KB and the size "$A_2$" can be 128 KB, for instance. Other spatial locality metrics, represented by vertical ellipses, can correspond to other components of the spatial locality 150, respectively. Such other components of the spatial locality can be, e.g., an ultra-short-range component (determined for a memory size $A << "A_1"$,) an intermediate-range component (determined for a memory size "$A_1$"<A<"$A_2$",) an ultra-long-range component (determined for a memory size $A >> "A_{12}"$,) and the like.

The values of the short-range and long-range components of the spatial locality 150 are initialized to 0 (zero). Subsequently, a set of "m" determinations are made whether addresses corresponding to the sequence of "m" references are within a distance $\pm \frac{1}{2}A_1$ from the block offset "$X_n$," corresponding to the reference operation, and another set of "m" determinations are made whether addresses corresponding to the sequence of "m" references are within a distance $\pm \frac{1}{2}A_2$ from the block offset "$X_n$," corresponding to the reference operation. The value of the short-range component of the spatial locality 150 can be incremented by 1 (one) for each positive determination from among the set of "m" determinations, and the value of the long-range component of the spatial locality 150 can be incremented by 1 (one) for each positive determination from among the other set of "m" determinations.

For example, the short-range component of the spatial locality 150 has a value of "$u/A_1$", where $0 \le u \le m$, if "u" references from among the sequence of "m" references correspond to addresses within an address space of size "$A_1$" centered on the block offset "$X_n$" corresponding to the reference operation; and the long-range component of the spatial locality 150 has a value of "$v/A_2$", where $0 \le v \le m$, if "v" references from among the sequence of "m" references correspond to addresses within an address space of size "$A_2$" centered on the block offset "$X_n$" corresponding to the reference operation. Note that the short-range and long-range components of the spatial locality 150 have a dimension of 1/(memory size), and can be expressed, e.g., in 1/KB. Moreover, expressing values of the short-range and long-range components of the spatial locality 150 as respective ratios of the respective counts "u" and "v" to the respective memory sizes "$A_1$" and "$A_2$" allows for comparing the values of the short-range and long-range spatial locality 150.

In another example, the short-range component of the spatial locality 150 has a value of "$u/m/A_1$", where $0 \le u/m \le 1$; and the long-range component of the spatial locality 150 has a value of "$v/m/A_2$", where $0 \le v/m \le 1$. The use of normalized counts "u/m" and "v/m" for expressing the respective short-range and long-range components of the spatial locality 150 allows for comparing short-range components of the spatial locality that were determined using sequences having different numbers, e.g., "$m_1$", "$m_2$", . . . , of references to addresses on the storage system 140 and long-range components of the spatial locality that were determined using sequences having different numbers, e.g., "$m_1$", "$m_2$", . . . , of references to addresses on the storage system 140 for each of the pairs of short-range and long-range components, respectively.

Once the values of the short-range and long-range components of the spatial locality 150 have been determined as described above, instant values of the short-range spatial locality metric 112 and the long-range spatial locality metric 114 can be calculated, respectively. For example, the instant value of the short-range spatial locality metric 112 is calculated as a weighted average between the determined value of the short-range component of the spatial locality 150 and a previously calculated value of the short-range spatial locality metric in accordance with Equation (1). Referring to Equation (1) in the current context, the notations $S_{A1}$(instant) and $S_{A1}$(previous) represent respective instant and previous values of the short-range spatial locality metric 112; and the notation $s(A_1, m; n)$ represents the value of the short-range component of the spatial locality 150 determined in reference with the operation corresponding to the block offset "$X_n$" and using a sequence of "m" references following the operation corresponding to the block offset "$X_n$". Similarly, the instant value of the long-range spatial locality metric 114 is calculated as a weighted average between the determined value of the long-range component of the spatial locality 150 and a previously calculated value of the long-range spatial locality metric as $$S_{A2}(\text{instant}) = \beta \times s(A2, m; n) + (1-\beta) \times S_{A2}(\text{previous}) \quad (2).$$

The notations $S_{A2}$(instant) and $S_{A2}$(previous) represent respective instant and previous values of the spatial locality metric 110. The notation $s(A_2, m; n)$ represents the instant value of the spatial locality 150 for the size "$A_2$" of address space on the storage system 140 determined in reference with the operation corresponding to the block offset "$X_n$" and using a sequence of "m" references following the operation corresponding to the block offset "$X_n$".

Subsequent values of the short-range and long-range components of the spatial locality 150 can be determined as described above in reference to another operation corresponding to the block offset "$X_{n+1}$" and another sequence of "m" operations following the other reference operation. For instance, a set of "m" determinations are made whether addresses corresponding to the other sequence of "m" references are within a distance $\pm \frac{1}{2}A_1$ from the block offset "$X_{n+1}$" corresponding to the other reference operation, and another set of "m" determinations are made whether addresses corresponding to the other sequence of "m" references are within a distance $\pm \frac{1}{2}A_2$ from the block offset "$X_{n+1}$" corresponding to the other reference operation. The value of the short-range component of the spatial locality 150 can be incremented by 1 (one) for each positive determination from among the set of "m" determinations, and the value of the long-range component of the spatial locality 150 can be incremented by 1 (one) for each positive determination from among the other set of "m" determinations. Further, a subsequent instant value $S_{A1}$(instant) of the short-range spatial locality metric 112 is calculated in accordance with Equation (1) using the previously calculated instant value of the short-range spatial locality metric 112 as the previous value $S_{A1}$(previous) of the short-range spatial locality metric 112, and the value $s(A_1, m; n+1)$ of the short-range component of the spatial locality 150 determined in reference with the operation corresponding to the block offset "$X_{n+1}$". Furthermore, a subsequent instant value $S_{A2}$(instant) of the long-range spatial locality metric 114 is calculated in accordance with Equation (2) using the previously calculated instant value of the long-range spatial locality metric 114 as the previous value $S_{A2}$(previous) of the long-range spatial locality metric 114, and the value $s(A_2, m; n+1)$ of the long-range component of the spatial locality 150 determined in reference with the operation corresponding to the block offset "$X_{n+1}$".

The spatial locality metrics 110, 112 and 114 described above in connection with FIGS. 1A-1D can be used to characterize spatial patterns of references to addresses of the storage system 140 as a whole, or to addresses of a particular region of the storage system 140. However, it has been observed empirically that accesses to a storage system can exhibit spatial localities that vary from one region of the storage system to another. Based on this observation, a storage system can be divided into multiple (fixed or variable-sized) regions $R_1, R_2, \ldots$, representing portions or subsections of the storage system 140 and the regions can be separately monitored for determining a spatial locality 150 for each region of the storage system 140. In this manner, blocks within regions having higher spatial locality can be cached at a priority and/or retained in cache memory for longer periods of time than blocks within regions having lower spatial locality.

Figures 1E, 1F:
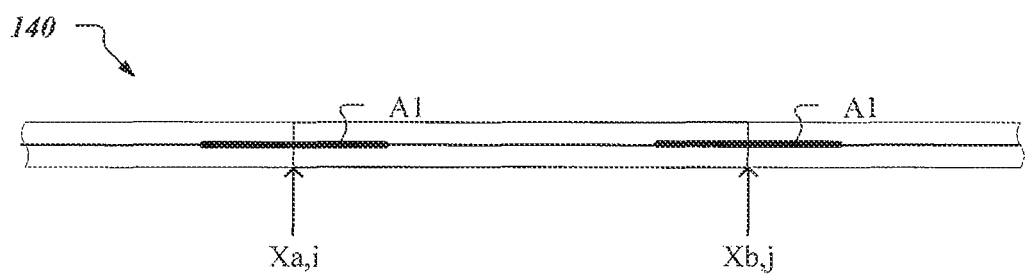

Table 3 in FIG. 1E includes examples of spatial locality metrics of respective regions $R_i$ and $R_j$ of the storage system 140. The spatial locality metric of region $R_i$ 120 is associated with the spatial locality of the region $R_i$ of the storage system, and the spatial locality metric of region $R_j$ 130 is associated with the spatial locality of the region $R_j$ of the storage system. Other spatial locality metrics, represented by ellipses, correspond to other regions of the $R_1, R_2, \ldots, R_N$ regions of the storage system 140, respectively. The spatial localities of regions $R_i$ and $R_j$ can be determined similarly to the above disclosure in connection with FIGS. 1A-1B. For example, a value of the spatial locality of the region $R_i$ can be determined using a sequence of "m" references to addresses on the region $R_i$ of the storage system 140. Further, a value of the spatial locality of the region $R_j$ can be determined using another sequence of "m" references to addresses on the region $R_j$ of the storage system 140.

FIG. 1F illustrates a portion of the storage system 140 and a block offset "$X_{a,i}$" of the region $R_i$ corresponding to a reference operation used to determine a value of the spatial locality of the region $R_i$ for a size "$A_1$" of address space on the region $R_i$ of the storage system 140. An address space having the size "$A_1$" spans a portion of the region $R_i$ of the storage system 140 centered on the block offset "$X_{a,i}$" from ($X_{a,i} - \frac{1}{2}A_1$) to ($X_{a,i} + \frac{1}{2}A_1$). Also illustrated in FIG. 1F is a block offset "$X_{b,j}$" of the region $R_j$ corresponding to another reference operation used to determine a value of the spatial locality of the region $R_j$ for the size "$A_1$" of address space on the region $R_j$ of the storage system 140. An address space having the size "$A_1$" spans a portion of the region $R_j$ of the storage system 140 centered on the block offset "$X_{b,j}$" from ($X_{b,j} - \frac{1}{2}A_1$) to ($X_{b,j} + \frac{1}{2}A_1$).

The values of the spatial localities of regions $R_i$ and $R_j$ can be initialized to 0 (zero). Subsequently, a set of "m" determinations are made whether addresses corresponding to the sequence of "m" addresses on the region $R_i$ of the storage system 140 are within a distance $\pm \frac{1}{2}A_1$ from the block offset "$X_{a,i}$" corresponding to the reference operation, and the value of the spatial locality of the region $R_i$ can be incremented by 1 (one) for each positive determination from among the set of "m" determinations. Further, another set of "m" determinations are made whether addresses corresponding to the other sequence of "m" addresses on the region $R_j$ of the storage system 140 are within a distance $\pm \frac{1}{2}A_1$ from the block offset "$X_{b,j}$" corresponding to the other reference operation, and the value of the spatial locality of the region $R_j$ can be incremented by 1 (one) for each positive determination from among the other set of "m" determinations.

For example, the spatial locality of the region $R_i$ has an integer value of "u", where $0 \leq u \leq m$, if "u" references from among the sequence of "m" references to addresses on the region $R_i$ of the storage system 140 correspond to addresses within an address space of size "$A_1$" centered on the block offset "$X_{a,i}$" corresponding to the reference operation; and the spatial locality of the region $R_j$ has an integer value of "v", where $0 \leq v \leq m$, if "v" references from among the other sequence of "m" references to addresses on the region $R_j$ of the storage system 140 correspond to addresses within an address space of size "$A_1$" centered on the block offset "$X_{b,j}$" corresponding to the other reference operation. In another example, the spatial locality of the region $R_i$ is normalized and has a fractional value of "u/m", where $0 \leq u/m \leq 1$; and the spatial locality of the region $R_j$ is normalized and has a fractional value of "v/m", where $0 \leq v/m \leq 1$. The use of normalized values for the spatial localities of the regions $R_i$ and $R_j$ allows for comparing the spatial localities of the regions $R_i$ and $R_j$ that were determined using sequences having different numbers, e.g., "$m_1$", "$m_2$", ..., of references to addresses on the regions $R_i$ and $R_j$ of the storage system 140.

Once the value of the spatial locality of the region $R_i$ has been determined as described above, an instant value of the spatial locality metric of the region $R_i$ 120 can be calculated as a weighted average between the determined value of the spatial locality of the region $R_i$ and a previously calculated value of the spatial locality metric of the region $R_i$. For example, the instant value of the spatial locality metric of the region $R_i$ 120 can be calculated as $$S_{A2}(\text{instant}|i)=\beta \times s(A1,m;a|i)+(1-\beta) \times S_{A2}(\text{previous}|i) \qquad (3).$$

The notations $S_{A1}(\text{instant}|i)$ and $S_{A1}(\text{previous}|i)$ represent respective instant and previous values of the spatial locality metric of the region $R_i$ 120. The notation $s(A_1, m; a|i)$ represents the value of the spatial locality of the region $R_i$ determined for the size "$A_1$" of address space on the region $R_i$ of the storage system 140 in reference with the operation corresponding to the block offset "$X_{a,i}$" and using a sequence of "m" references following the operation corresponding to the block offset "$X_{a,i}$". Moreover, once the value of the spatial locality of the region $R_j$ has been determined as described above, an instant value of the spatial locality metric of the region $R_j$ 130 can be calculated as a weighted average between the determined value of the spatial locality of the region $R_j$ and a previously calculated value of the spatial locality metric of the region $R_j$. For example, the instant value of the spatial locality metric of the region $R_j$ 130 can be calculated as $$S_{A1}(\text{instant}|j)=\beta \times s(A1,m;b|j)+(1-\beta) \times S_{A1}(\text{previous}|j) \qquad (4).$$

The notations $S_{A1}(\text{instant}|j)$ and $S_{A1}(\text{previous}|j)$ represent respective instant and previous values of the spatial locality metric of the region $R_j$ 130. The notation $s(A_1, m; b|j)$ represents the value of the spatial locality of the region $R_j$ determined for the size "$A_1$" of address space on the region $R_j$ of the storage system 140 in reference with the operation corresponding to the block offset "$X_{b,j}$" and using another sequence of "m" references following the operation corresponding to the block offset "$X_{b,j}$".

A subsequent value of the spatial locality of the region $R_i$ can be determined as described above, however, in reference to another operation corresponding to a block offset "$X_{a+1,i}$" (not shown in FIG. 1F) and another sequence of "m" operations that follow the other reference operation. For instance, "m" determinations are made whether addresses corresponding to the other sequence of "m" references are within a distance±½$A_1$ from the block offset "$X_{a+1,i}$" corresponding to the other reference operation, and the value of the spatial locality of the region $R_i$ can be incremented by 1 (one) for each positive determination from among the "m" determinations. Further, a subsequent instant value $S_{A1}(\text{instant}|i)$ of the spatial locality metric of the region $R_i$ 120 is calculated in accordance with Equation (3) using the previously calculated instant value of the spatial locality metric of the region $R_i$ 120 as the previous value $S_{A1}(\text{previous}|i)$ of the spatial locality metric of the region $R_i$ 120, and the value $s(A_1, m; A+1|i)$ of the spatial locality of the of the region $R_i$ determined for the size "$A_1$" of address space on the region $R_i$ of the storage system 140 in reference with the operation corresponding to the block offset "$X_{a+1,i}$".

Additionally, a subsequent value of the spatial locality of the region $R_j$ can be determined as described above, however, in reference to an additional operation corresponding to a block offset "$X_{b+1,j}$" (not shown in FIG. 1F) and an additional sequence of "m" operations that follow the additional reference operation. For instance, "m" determinations are made whether addresses corresponding to the additional sequence of "m" references are within a distance±½$A_1$ from the block offset "$X_{b+1,j}$" corresponding to the additional reference operation, and the value of the spatial locality of the region $R_j$ can be incremented by 1 (one) for each positive determination from among the "m" determinations. Further, a subsequent instant value $S_{A1}(\text{instant}|j)$ of the spatial locality metric of the region $R_j$ 130 is calculated in accordance with Equation (4) using the previously calculated instant value of the spatial locality metric of the region $R_j$ 130 as the previous value $S_{A1}(\text{previous}|j)$ of the spatial locality metric of the region $R_j$ 130 and the value $s(A_1, m; b+1|j)$ of the spatial locality of the of the region $R_j$ determined for the size "$A1$" of address space on the region $R_j$ of the storage system 140 in reference with the operation corresponding to the block offset "$X_{b+1,j}$".

Moreover, the spatial locality metrics 112, 114, 120 and 130 described above in connection with FIGS. 1C-1F can be combined to calculate short-range and long-range spatial locality metrics for each of multiple regions of the storage system 140 as described below in connection with FIG. 1H, for instance. Further, numerous caching algorithms can be implemented in accordance with instant values of short-range and long-range metrics of individual regions of the storage system 140 as described below in connection with FIGS. 4A-4B and 5A-5B.

Figures 1G, 1H:
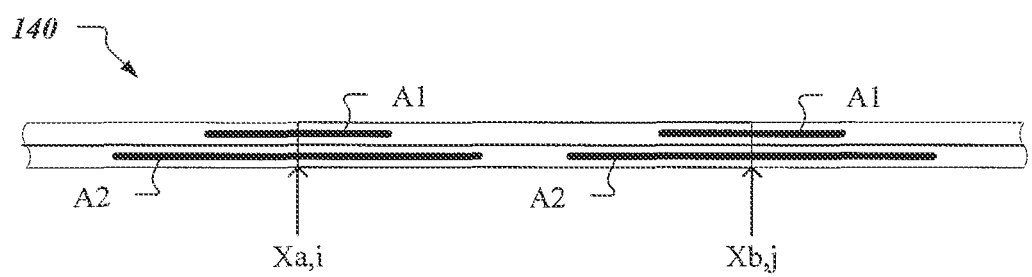

Table 4 in FIG. 1G includes examples of short-range and long-range spatial locality metrics of regions $R_i$ and $R_j$ of the storage system 140. The short-range spatial locality metric of region $R_i$ 122 is associated with the short-range component of the spatial locality of the region $R_i$, and the short-range spatial locality metric of region $R_j$ 132 is associated with the short-range component of the spatial locality of the region $R_j$. The long-range spatial locality metric of region $R_i$ 124 is associated with the long-range component of the spatial locality of the region $R_i$, and the long-range spatial locality metric of region $R_j$ 134 is associated with the long-range component of the spatial locality of the region $R_j$. The vertical ellipses for a given region of the storage system 140 correspond to other spatial locality metrics as described above in connection with Table 2. The horizontal ellipses for a given component of the spatial locality 150 correspond to other regions of the storage system 140 as described above in connection with Table 3.

The short-range spatial locality metric of region $R_i$ 122 can be calculated based on Equation (3), where the notations $S_{A1}(\text{instant}|i)$ and $S_{A1}(\text{previous}|i)$ represent respective instant and previous values of the short-range spatial locality metric of the region $R_i$ 122; and the notation $s(A_1, m; a|i)$ represents the value of the short-range component of the spatial locality of the region $R_i$ determined for the size "$A_1$" of address space on the region $R_i$ of the storage system 140 in reference with an operation corresponding to the block offset "$X_{a,i}$" and using a sequence of "m" references following the operation corresponding to the block offset "$X_{a,i}$". (The block offset "$X_{a,i}$" is illustrated in FIG. 1H.) Further, the short-range component of the spatial locality of the region $R_i$ can be determined according to the above disclosure in connection with FIGS. 1C and 1D, as applied to the region $R_i$ of the storage system 140. The short-range spatial locality metric of region $R_j$ 132 can be calculated based on Equation (4), where the notations $S_{A1}(\text{instant}|j)$ and $S_{A1}(\text{previous}|j)$ represent respective instant and previous values of the short-range spatial locality metric of the region $R_j$ 132; and the notation $s(A_1, m; b|j)$ represents the value of the short-range component of the spatial locality of the region $R_j$ determined for the size "$A_1$" of address space on the region $R_j$ of the storage system 140 in reference with an operation corresponding to the block offset "$X_{b,j}$" and using another sequence of "m" references following the operation corresponding to the block offset "$X_{b,j}$". (The block offset "$X_{b,j}$" is illustrated in FIG. 1H.) Furthermore, the short-range component of the spatial locality of the region $R_j$ can be determined according to the above disclosure in connection with FIGS. 1C and 1D, as applied to the region $R_j$ of the storage system 140.

The long-range spatial locality metric of region $R_i$ 124 can be calculated as $$S_{A2}(\text{instant}|i) = \beta \times s(A2,m;a|i) + (1-\beta) \times S_{A2}(\text{previous}|i) \quad (5).$$

The notations $S_{A2}(\text{instant}|i)$ and $S_{A2}(\text{previous}|i)$ represent respective instant and previous values of the long-range spatial locality metric of the region $R_i$ 124. The notation $s(A_2, m; a|i)$ represents the value of the long-range component of the spatial locality of the region $R_i$ determined for the size "$A_2$" of address space on the region $R_i$ of the storage system 140 in reference with the operation corresponding to the block offset "$X_{a,i}$" and using a sequence of "m" references following the operation corresponding to the block offset "$X_{a,i}$". Additionally, the long-range component of the spatial locality of the region $R_i$ can be determined according to the above disclosure in connection with FIGS. 1C and 1D, as applied to the region $R_i$ of the storage system 140. The long-range spatial locality metric of region $R_j$ 134 can be calculated as $$S_{A2}(\text{instant}|j) = \beta \times s(A2,m;b|j) + (1-\beta) \times S_{A2}(\text{previous}|j) \quad (6).$$

The notations $S_{A1}(\text{instant}|j)$ and $S_{A2}(\text{previous}|j)$ represent respective instant and previous values of the long-range spatial locality metric of the region $R_j$ 134. The notation $s(A_2, m; b|j)$ represents the value of the long-range component of the spatial locality of the region $R_j$ determined for the size "$A_2$" of address space on the region $R_j$ of the storage system 140 in reference with the operation corresponding to the block offset "$X_{b,j}$" and using another sequence of "m" references following the operation corresponding to the block offset "$X_{b,j}$". Additionally, the long-range component of the spatial locality of the region $R_j$ can be determined according to the above disclosure in connection with FIGS. 1C and 1D, as applied to the region $R_j$ of the storage system 140.

Figure 2A:
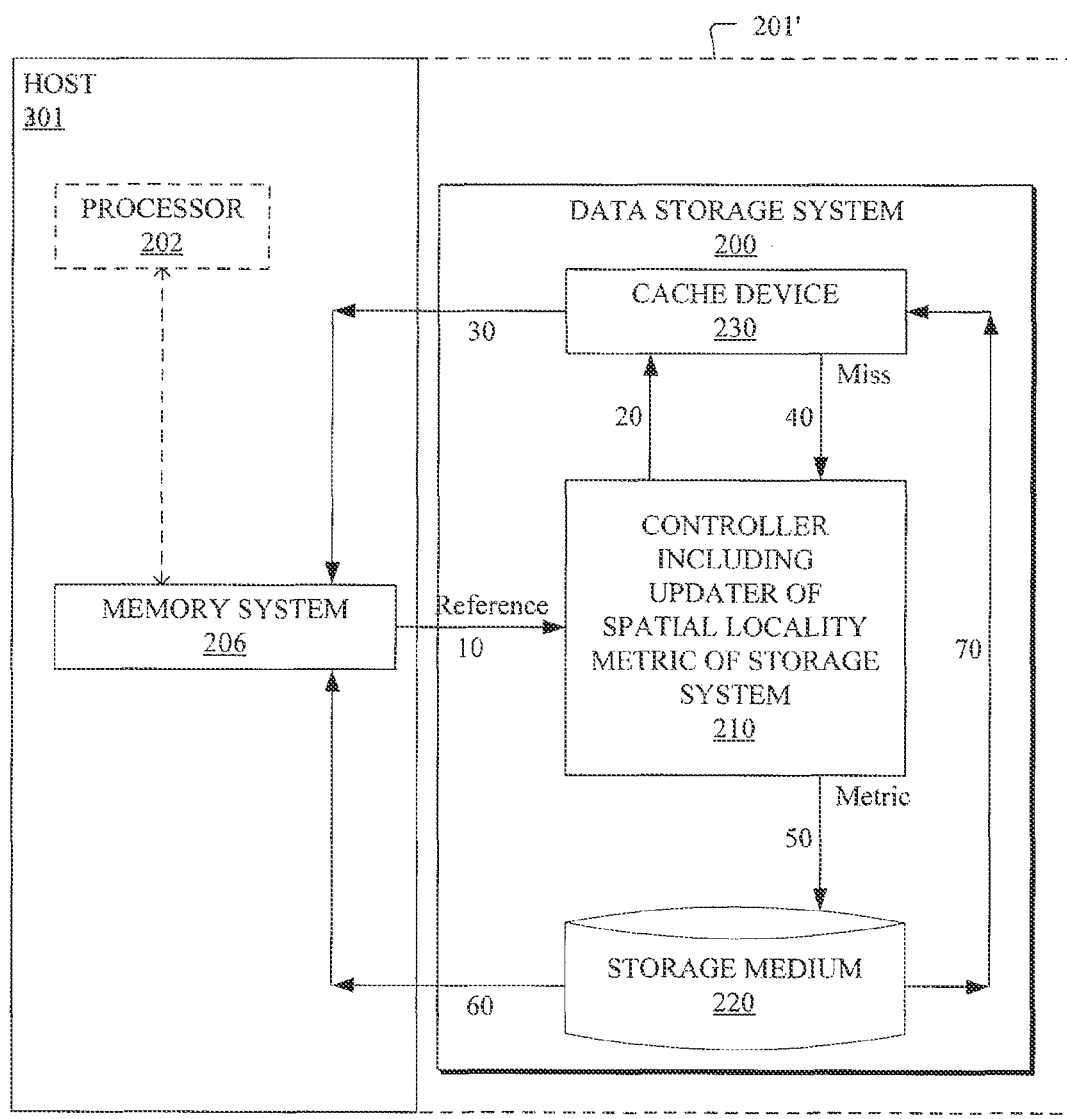
FIGS. 2A-2C show aspects of an example of a system for caching data stored on one or more storage devices of a storage system based on a metric of spatial locality of the storage system.

FIG. 2A shows an example of a system for caching data stored on one or more devices of a storage system 200 based on a metric of spatial locality of the storage system. The spatial locality metric can be any one or more metrics 110, 112, 114, 120, 122, 124 130, 132 and 134 described above in connection with FIGS. 1A-1H. The storage system 200 can be external to or part of a host system 201/201'. In some implementations, the storage system 200 includes the one or more storage devices 220, a cache device 230 and a controller 210 communicatively coupled with the one or more storage devices 220 and with the cache device 230 through multiple communication paths 20, 40, 50 and 70. The one or more storage devices 220 can be individual storage devices (e.g., hard drives) as well as combinations of storage devices, e.g., RAID, NAS, and SAN.

Figure 2B:
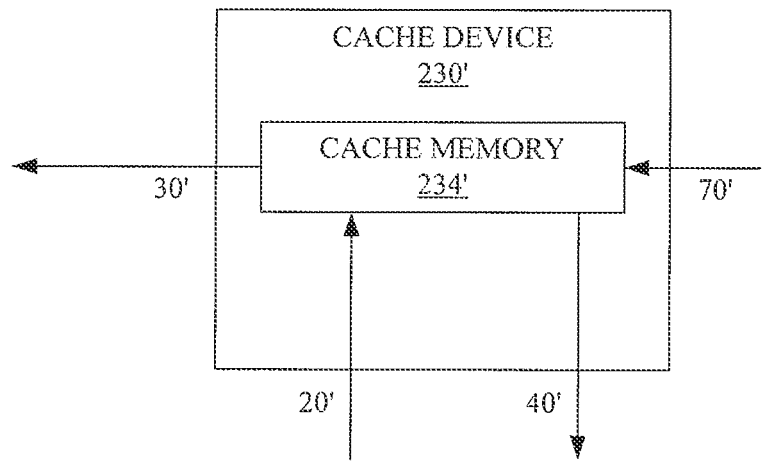
Figure 2C:
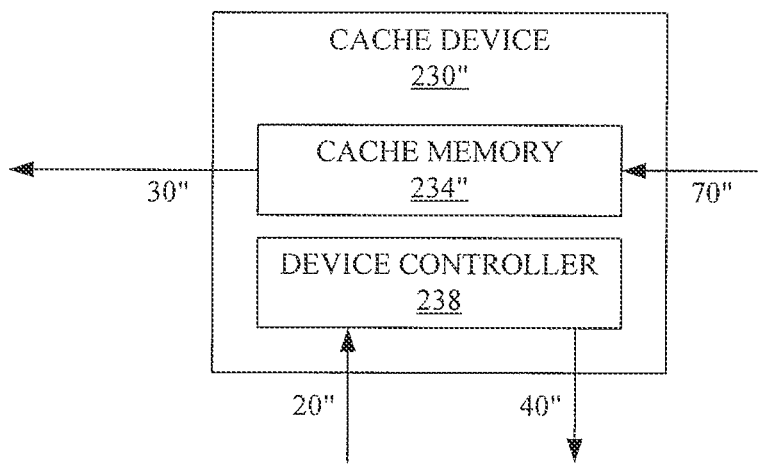

In some implementations, the controller 210 can be arranged externally to the storage system 200. Further, the controller 210 is configured to interface with a memory system 200 and/or a processor 202 of the host system 201/201' through communication path 10. Additional communication paths 30 and 60 can be established between the storage system 200 and the memory system 206 (and/or the processor 202.) FIG. 2B shows a first example of an implementation of a cache device 230' including cache memory 234'. In this first implementation, caching functionality of the storage system 200 (including generating cache hits and cache misses) is performed by the controller 210. FIG. 2C shows a second example of an implementation of a cache device 230" including cache memory 234" and a device controller 238. In this second implementation, the caching functionality of the storage system 200 (including generating cache hits and cache misses) can be performed by the device controller 238 of the cache device 230".

The controller 210 can be part of or include an Application Specific Integrated Circuit (ASIC), an electronic circuit, a processor (shared, dedicated, or group) and/or memory (shared, dedicated, or group) that execute one or more software or firmware programs, a combinatorial logic circuit, and/or other suitable components that provide the described functionality. For example, the controller 210 is configured to generate and update a spatial locality metric of the storage system 200.

The controller 210 can receive (through the communication path 10) from the memory system 206 a specified quantity "m" of address references associated with the storage system 200. For example, the quantity "m" of address references can be specified programmatically. Further, the quantity "m" can be changed based on the type of storage devices 220, the type of application run by the host system 201/201!, and the like. For example, the quantity "m" can be set to be equal to 15 references to addresses on the storage system 200. Other examples of "m"-values are 5, 10, 15, 20, 30, 50, 100, . . . , etc.

Furthermore, the controller 210 is configured to determine spatial locality on the storage system 200 as a fraction of the received specified quantity "m" of the sequential address references that are within first distance from a block offset "$X_n$" of first address reference of the sequential address references. The determination of the spatial locality on the storage system 200 can be performed as described above in this specification in connection with any of FIGS. 2A-2H. Also as part of determining the spatial locality on the storage system 200, the controller 210 can be configured to omit a random quantity of address references between previous determination of the spatial locality and the current determination of the spatial locality. Systematic errors introduced by periodic artifacts can be reduced by performing such random sampling. Therefore, the accuracy of the spatial locality on the storage system 200 may increase. Note that the random number generation can be either pseudorandom number generation (e.g., based on a predefined seed and a modulo operator) or true random number generation (e.g., based on a source of random input, such as a sensor to detect cosmic background radiation).

In addition, the controller 210 is configured to combine the determined spatial locality with a previously determined spatial locality into a spatial locality metric of the storage system 200. Multiple examples of spatial locality metrics of the storage system 200 have been described above in connection with FIGS. 2A-2H. For example, a spatial locality metric corresponding to a particular memory size can be calculated for the storage system 200 as a whole, as described above in connection with FIGS. 2A and 2B. As another example, short-range and long-range spatial locality metrics corresponding to respective small and large memory sizes can be calculated for the storage system 200 as a whole, as described above in connection with FIGS. 2C and 2D. As yet another example, spatial locality metrics corresponding to a particular memory size can be calculated for respective reasons of the storage system 200, as described above in connection with FIGS. 2E and 2F. Moreover, short-range and long-range spatial locality metrics corresponding to respective small and large memory sizes can be calculated for each of multiple regions of the storage system 200, as described above in connection with FIGS. 2G and 2H. Each of the foregoing spatial locality metrics includes a weighted sum of the determined spatial locality and the previously determined spatial locality in accordance with Equations 1-6.

The controller 210 can use one or more of the calculated spatial locality metrics or can provide the one or more of the spatial locality metrics (through communication path 50) to the device controller 224 to cache data from the one or more storage devices 220 to the cache device 230 (through communication path 70). Various caching techniques based on a current value of the spatial locality metric are described below in connection with FIGS. 5A-5B and 6A-6B.

The controller 210 is further configured to receive from the memory system 206 (through the communication path 10) a reference to an address of the storage system 200. The received address reference can correspond to data stored at a given block offset "X" on the storage system 200. The controller 210 can relay the received reference to the cache device 230 (through communication path 20.) If the referenced data is cached in the cache device 230, a cache hit can be generated and the referenced data is provided to the memory system 206 from the cache device 230 (through communication path 30.) In some implementations, the communication path 30 corresponds to the paths 20 and 10 traversed in reverse-direction. However, if the referenced data is not cached in the cache device 230, a cache miss can be generated and the referenced data is provided to the memory system 206 from the one or more storage devices 220 (through communication path 60.) In some implementations, the communication path 60 corresponds to the paths 50 and 10 traversed in reverse-direction. The controller 210 is further configured to detect the cache miss for the received address reference in the cache device 230 (through communication path 40.) In some implementations, the communication path 40 corresponds to the path 20 traversed in reverse-direction. In response to the detection of the cache miss, the controller 210 is further configured to select data relating to the given block offset "X" or the storage system 200 (through communication path 50) for caching to the cache device 230 in accordance with a current value of the spatial locality metric (through communication path 70,) as described below in connection with FIGS. 5A-5B and 6A-6B. In some implementations, the communication path 70 corresponds to the paths 50 and 40 traversed in reverse-direction.

Figure 3:
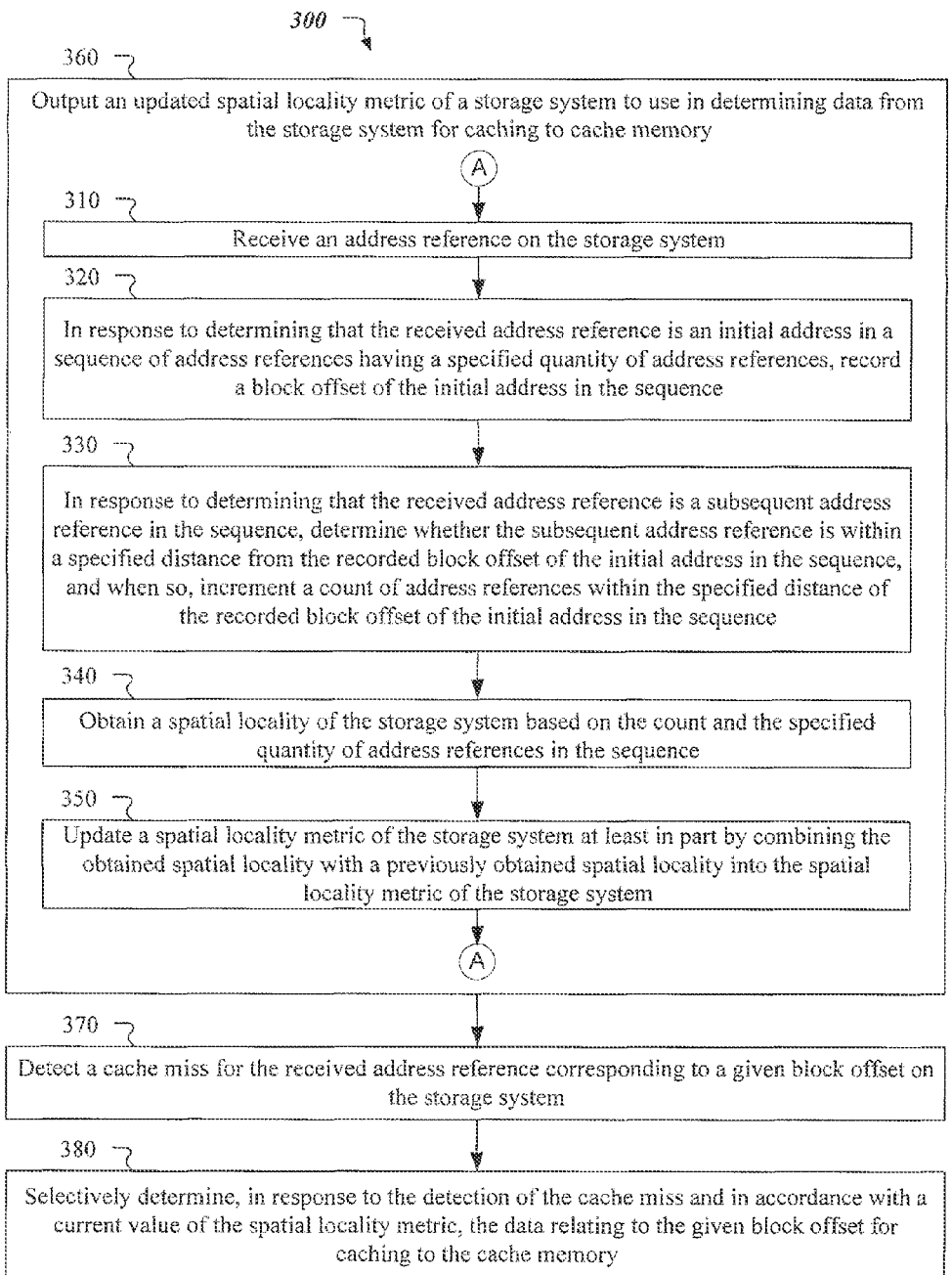
FIG. 3 shows an example of a method for updating a spatial locality metric of a storage system.

FIG. 3 shows an example of a method 300 for generating and updating a spatial locality metric of a storage system. The method 300 can be performed by data processing apparatus including one or more of the controller 210, the cache device 230 and the processor 202 described above in connection with FIG. 2A.

At 360, an updated spatial locality metric is output for determining data from the storage system to be cached to cache memory. The spatial locality metric is updated by the data processing apparatus by cyclically performing at least the aspects 310-350 as described below. Examples of spatial locality metrics that can be updated in accordance with 360 have been described above in connection with FIGS. 2A-2H.

At 310, an address reference on a storage system is received. In response to determining that the received address reference is an initial address in a sequence of address references having a specified quantity of address references, a block offset of the initial address in the sequence is recorded at 320. The specified quantity of address references in the sequence is denoted "m" and can be preset to m=15, for instance. However, the specified quantity "m" of address references in the sequence can be modified in software/firmware.

In response to determining that the received address reference is a subsequent address reference in the sequence, a determination whether the subsequent address reference is within a specified distance from the recorded block offset of the initial address in the sequence is made at 330. The specified distance in address space is denoted "$A_1$" and can be $A_1$=64 KB, 128 KB, 256 KB, etc. When a result of the determination is positive, (i.e., the subsequent address reference is within the specified distance "$A_1$" from the recorded block offset of the initial address in the sequence,) a count of address references within the specified distance "$A_1$" of the recorded block offset of the initial address in the sequence is incremented. The count is denoted "k" and can have an integer value $0 \leq k \leq m$.

At 340, a spatial locality on the storage system is obtained based on the count "k" and the specified quantity "m" of address references in the sequence. In some implementations, obtaining the spatial locality includes determining a fraction "k/m" of the count of address references in the sequence that are within the specified distance from the recorded block offset of the initial address in the sequence. The determined fraction satisfies the inequalities $0 \leq k/m \leq 1$. Values of the spatial locality normalized in this fashion can be used to compare spatial localities "$k_1/m_1$", "$k_2/m_2$", . . . , determined based on respective sequences of address references having different quantities "$m_1$", "$m_2$", . . . , of references. For example, a first spatial locality of 4 is determined for a given storage system by using a first sequence having 12 references to addresses on the given storage system. Later, a second spatial locality of 6 is determined for the given storage system by using a second sequence having 30 references to addresses on the given storage system. And even later, a third spatial locality of 3 is determined for the given storage system by using a third sequence having 6 references to addresses on the given storage system. While it is harder to compare the raw values of the first, second and third spatial localities, the normalized values can be used to easily determine that the third spatial locality of 3/6=0.50 is larger than the first spatial locality of 4/12=0.33, and that the latter is larger than the second spatial locality of 6/30=0.20.

Further, the received address reference can be omitted from obtaining the spatial locality in response to determining that the received address reference is one of a random quantity "r" of address references between last ($m^{th}$) address reference of a previous sequence of "m" address-references and the initial ($1^{st}$) address reference in a subsequent sequence of "m" address references. The random number "r" can be chosen to satisfy the inequalities $0 \leq r \leq N$, where N can be preset in software/firmware as the maximum number of operations that can be omitted from obtaining the spatial locality. For example, if m=20 and N=10, first 20 references to addresses on the storage system are used for obtaining the spatial locality, the next 4 references (21-23) are not used for obtaining the spatial locality, the next 20 references (24-43) are used, the next 7 references (44-50) are not used, the next 20 references (51-70) are used, the next 10 references (71-80) are not used, the next 20 references (81-100) are used, the next 2 references (101-102) are not used, the next 20 references (103-122) are used, zero references are skipped, the next 20 references (123-142) are used, the next 7 references (143-149) are not used, and so on. In this example, random numbers 4, 7, 10, 2, 0, 7, . . . (between 0 and 10) of operations have been omitted between consecutive determinations of the spatial locality on the storage system. The random sampling described above contributes to increasing the accuracy of the spatial locality metric calculation by reducing the contribution of periodically occurring artifacts.

At 350, the spatial locality metric of the storage system is updated at least in part by combining the obtained spatial locality with a previously obtained spatial locality into the spatial locality metric. The combining includes generating a weighted sum of the obtained spatial locality and the previously obtained spatial locality, for example, in accordance with any one or more of Equations 1-6. The weight is denoted β (where 0<β≤1) and can be chosen to indicate a bias on the instant value of the spatial locality metric by historical values of the spatial locality metric. For example, a weight β that is close to 0 (zero) indicates that the spatial locality metric is dominated by historical values and that the instant value has a small contribution to the spatial locality metric. In another example, a weight β that is close to 1 (one) indicates that the instant value of the spatial locality metric has a dominant contribution to the spatial locality metric and that historical values have a small contribution to the spatial locality metric. In fact, when the weight β=1 the historical values play no role in calculating the value of the spatial locality metric. In the latter case, the spatial locality metric of the storage system is identical to the spatial locality of the storage system.

At 370, a cache miss for the received address reference is detected. The received address reference corresponds to a given block offset on the storage system. At 380, data relating to the given block offset is selectively determined, responsive to detecting the cache miss and in accordance with a current value of the spatial locality metric, such that the selectively determined data can be cached to the cache memory.

Figure 4A:
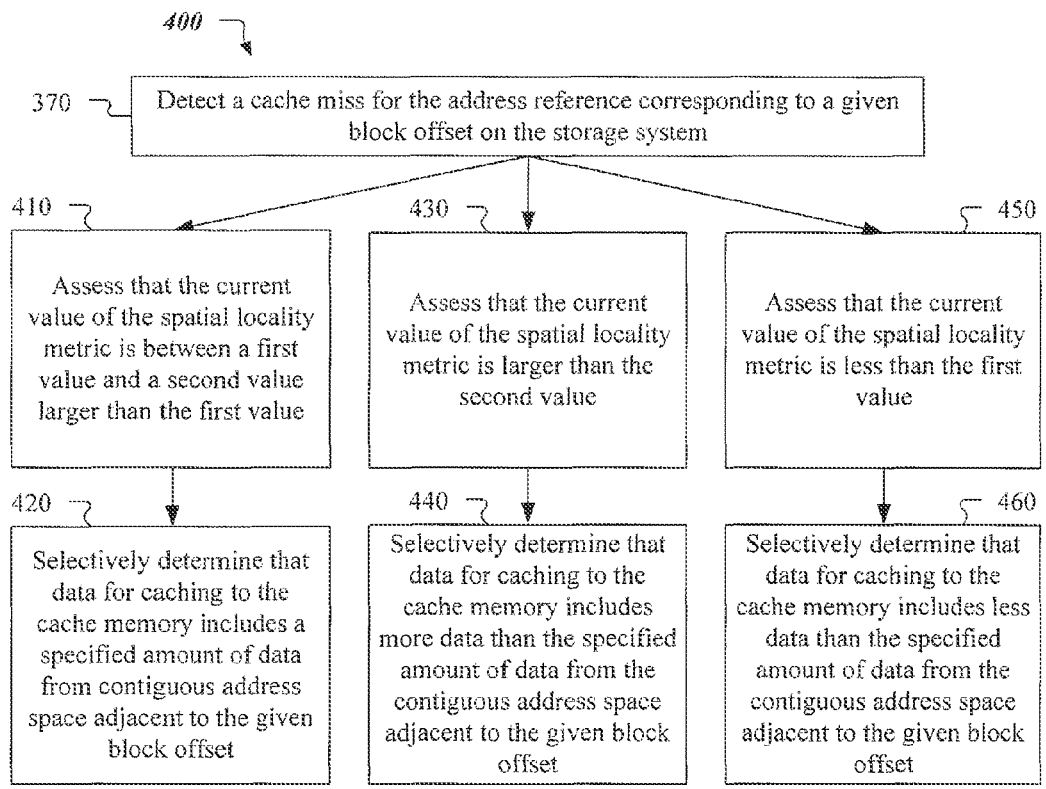
FIGS. 4A and 4B show aspects of an example of a method for caching data stored in a storage system in accordance with a current value of a spatial locality metric of the storage system.

FIG. 4A shows aspects of an example of a method 400 for caching data stored on a storage system in accordance with a current value of a spatial locality metric of the storage system. The method 400 can be combined with the method 300 to cache data in response to detecting the cache miss at 370. The method 400 can also be performed by data processing apparatus including one or more of the controller 210, the cache device 230 and the processor 202 described above in connection with FIG. 2A. In addition, the method 400 can be applied to any of the spatial locality metrics described above in connection with FIGS. 2A-2H.

Figure 4B:
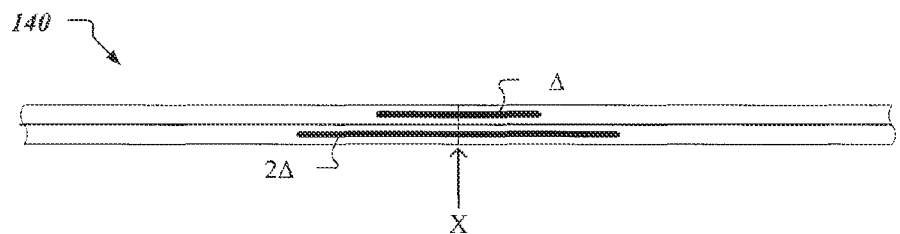

At 370, a cache miss for the received reference to an address of the storage system is detected. FIG. 4B illustrates a block offset "X" associate with the address on the storage system 240 that corresponds to the cache miss.

In response to detecting the cache miss, an assessment of the spatial locality metric results in, at 410, a current value of the spatial locality metric being between a first value and a second value larger than the first value. This value range for the spatial locality metric can be specified in software/hardware to correspond to a particular interval, for example, to a range between 25 percentile and 75 percentile of historical values of the spatial locality metric. In another example, the particular interval of spatial locality values can be specified to be between 5 percentile and 95 percentile of the historical values. In some implementations, the historical values can be maintained by the storage system. In some implementations, the historical values can be maintained externally to the storage system, e.g., by the host system 201/201'. To calculate the $k^{th}$ percentile (e.g., k=25) from among a set of N (e.g., N=250) historical measurements of the spatial locality, the N historical measurements are first sorted from smallest value to the largest value. The $k^{th}$ percentile corresponds to the value of the k*N/100 measurement of the sorted set of N measurements. In this case, the 25 percentile of the historical values of the spatial locality metric corresponds to the value of the $50^{th}$ spatial locality measurement in the sorted set of 200 spatial locality measurements (25*200/100.) Similarly, the 5 percentile of the historical values of the spatial locality metric corresponds to the value of the $10^{th}$ spatial locality measurement in the sorted set of 200 spatial locality measurements (5*200/100.) Any other percentile values can be calculated in this manner and can be used, for example, to set the lower and upper bounds of the particular interval described in connection with the assessment at 410.

At 420, data for caching to the cache memory is selectively determined to include a specified amount of data from contiguous memory adjacent to the given block offset "X", responsive to the result of the assessment at 410. The specified amount of data is denoted "Δ" in FIG. 4B. In some implementations, the specified amount of data "Δ" can be related to the memory size "$A_1$" that is used for determining the spatial locality on the storage system 240. For instance, the specified amount of data "Δ" can be a multiple of, equal to or a fraction of the memory size "$A_1$". For example, upon detection of a cache miss corresponding to "X", and in response to assessing an instant value of a spatial locality metric between 5-95 percentile of historical values, where the spatial locality metric is determined based on a memory size $A_1$=64 KB, the amount of data to be cached is selectively determined to be Δ=$A_1$=64 KB, and the cached data is selected from the memory interval (X−32 KB, X+32 KB).

In response to detecting the cache miss, the assessment of the spatial locality metric results in, at 430, the current value of the spatial locality metric being larger than the second value. This large instant value of the spatial locality metric is indicative of a high probability that addresses adjacent to the block offset "X" (which is associated with the address on the storage system 240 that corresponds to the cache miss) will be referenced in the near future (i.e., during subsequent "m" read/write operations.)

At 440, data for caching to the cache memory is selectively determined to include more than the specified amount of data "Δ" from contiguous memory adjacent to the given block offset "X", responsive to the result of the assessment at 430. In some implementations, the selectively determined data for caching to the cache memory includes twice the specified amount of data "Δ" from the contiguous memory adjacent to the given block offset "X" (as illustrated in FIG. 4B,) if the current value of the spatial locality metric is larger than the second value. For example, upon detection of a cache miss corresponding to "X", and in response to assessing an instant value of a spatial locality metric larger than 95 percentile of historical values, where the specified amount of data is Δ=64 KB, the amount of data to be cached is selectively determined to be 2Δ=128 KB, and the cached data is selected from the memory interval (X−64 KB, X+64 KB).

In response to detecting the cache miss, the assessment of the spatial locality metric results in, at 450, the current value of the spatial locality metric being less than the first value. This small instant value of the spatial locality metric is indicative of a low probability that addresses adjacent to the block offset "X" (which is associated with the address on the storage system 240 that corresponds to the cache miss) will be referenced in the near future (i.e., during subsequent "m" read/write operations.)

At 460, data for caching to the cache memory is selectively determined to include less than the specified amount of data "Δ" from contiguous memory adjacent to the given block offset "X", responsive to the result of the assessment at 450. In some implementations, the selectively determined data for caching to the cache memory is zero, if the current value of the spatial locality metric is smaller than the first value. For example, upon detection of a cache miss corresponding to "X", and in response to assessing an instant value of a spatial locality metric smaller than a percentile of historical values, where the specified amount of data is Δ=64 KB, the amount of data to be cached is selectively determined to be 0 (zero).

Figure 5A:
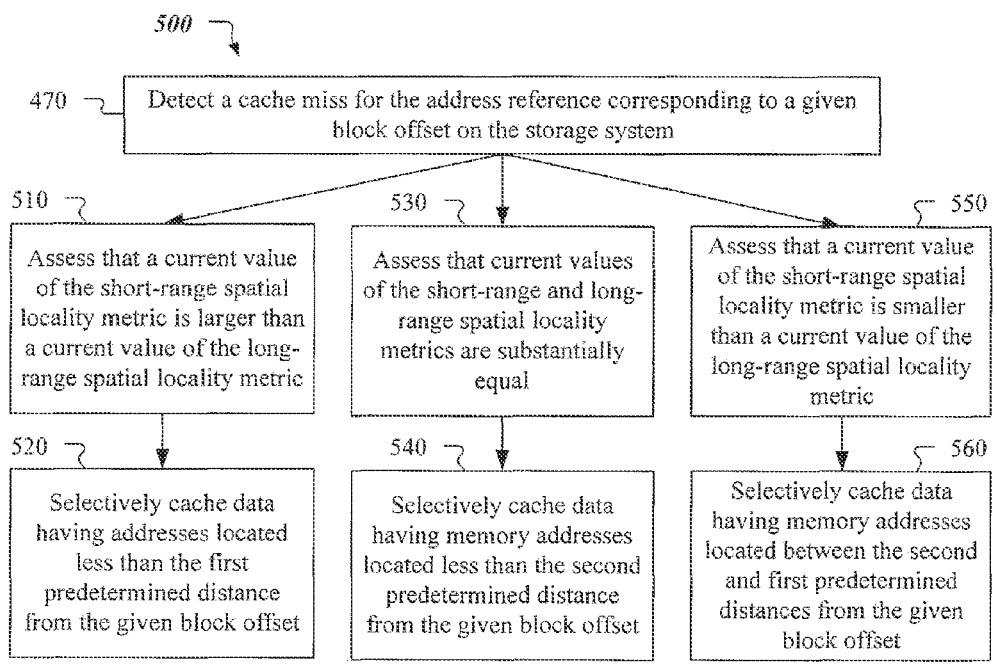
FIGS. 5A and 5B show aspects of another example of a method for caching data stored in a storage system in accordance with a current value of another spatial locality metric of the storage system.

FIG. 5A shows aspects of an example of another method 500 for caching data stored on a storage system in accordance with current values of short-range and long-range spatial locality metrics of the storage system. The method 500 can be combined with the method 300 to cache data in response to detecting the cache miss at 370. The method 500 can also be performed by data processing apparatus including one or more of the controller 210, the cache device 230 and the processor 202 described above in connection with FIG. 2A.

As described above in connection with FIGS. 2C-2D and 2G-2H, a short-range component of the spatial locality can be determined as a fraction "$k_1/m$" of the count "$k_1$" of address references in a sequence of "m" address references that are within an interval of specified memory size "$A_1$" centered on a block offset "$X_n$" of the initial address in the sequence divided by the specified memory size "$A_1$". A long-range component of the spatial locality can be determined as another fraction "$k_2/m$" of another count "$k_2$" of address references in the sequence of "m" address references that are within another interval of another specified memory size "$A_2$" centered on the block offset "$X_n$" of the initial address in the sequence divided by the other specified memory size "$A_2$", where $A_1 < A_2$.

In some implementations, the short-range component of the spatial locality can be determined as a count "$k_1$" of address references in a sequence of "m" address references that are within an interval of specified memory size "$A_1$" centered on a block offset "$X_n$" of the initial address in the sequence, while the long-range component of the spatial locality can be determined as another count "$k_2$" of address references in the sequence of "m" address references that are within another interval of another specified memory size "$A_2$" centered on the block offset "$X_n$" of the initial address in the sequence but are not in the interval of specified memory size "$A_1$" centered on a block offset "$X_n$" of the initial address in the sequence.

Further, the short-range spatial locality metric $S_{A1}$ is related to the determined short-range component of the spatial locality $s(A_1, m; n)$ through Equations 1, 3 or 4, while the long-range spatial locality metric $S_{A2}$ is related to the determined long-range component of the spatial locality $s(A_2, m; n)$ through Equations 2, 5 or 6.

Figure 5B:
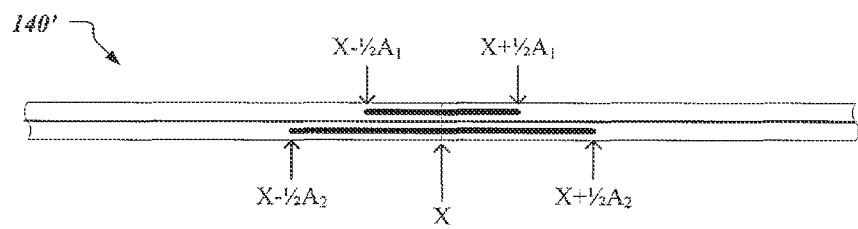

Returning to FIG. 5A, at 370, a cache miss for the received reference to an address of the storage system is detected. FIG. 5B illustrates a block offset "X" associated with the address on the storage system 240 that corresponds to the cache miss. In addition, FIG. 5B depicts an interval of memory size $A_2$ centered on the block offset "X" and another interval of memory size $A_2$ centered on the block offset "X", where the memory sizes $A_1$ and $A_2$ correspond to the respective short-range and long-range spatial locality metrics of storage system 240.

In response to detecting the cache miss, an assessment of the short-range and long-range spatial locality metrics results in, at 510, a current value of the short-range spatial locality metric being larger than a current value of the long-range spatial locality. The large instant value of the short-range spatial locality metric is indicative of a large spatial-density of references to addresses within the interval of memory size $A_1$ centered on the block offset "X", while the small instant value of the long-range spatial locality metric is indicative of a small spatial-density of references to addresses within the other interval of memory size $A_2$ centered on the block offset "X". Because the interval of memory size $A_1$ and the other interval of memory size $A_2$ have a common center, X, the result of the assessment 510 necessarily implies that the number of references to addresses within the edge portions $(X-\frac{1}{2}A_2, X-\frac{1}{2}A_1)$ and $(X+\frac{1}{2}A_1, X+\frac{1}{2}A_2)$ is expected to be smaller than the number of references to addresses within the center portion $(X-\frac{1}{2}A_1, X+\frac{1}{2}A_1)$ of the other interval of memory size $A_2$.

Consequently, at 520, data for caching to the cache memory is selected to have addresses within the interval having memory size $A_1$ centered on the block offset "X". As described above in connection with FIGS. 4A and 4B, the amount of pre-fetched data can, but need not be, the same as the size, e.g., $A_1$, used in the metric determination. For example, upon detection of a cache miss corresponding to "X", and in response to assessing that the instant value of the short-range spatial locality metric is larger than the instant value of the long-range spatial locality metric, and further when the memory size corresponding to the short-range spatial locality metric is $A_1$=64 KB, the data to be cached is selected from the memory interval (X−32 KB, X+32 KB).

Further, in response to detecting the cache miss, an assessment of the short-range and long-range spatial locality metrics results in, at 330, a current value of the short-range spatial locality metric being substantially equal to a current value of the long-range spatial locality. Metric values are considered to be substantially equal when the differences between the two metric values are less than or equal to noise resulting from measuring the metric (e.g., noise due to measurement repeatability and the like.) The substantial equality of the instant values of the short-range and long-range spatial locality metrics is indicative of substantially equal spatial-densities of references to addresses within the interval of memory size $A_1$ centered on the block offset "X" and within the other interval of memory size $A_2$ centered on the block offset "X". Because the interval of memory size $A_1$ and the other interval of memory size $A_2$ have a common center, X, the result of the assessment 530 necessarily implies that references to addresses are expected to be uniformly distributed between the edge portions $(X-\frac{1}{2}A_2, X-\frac{1}{2}A_1)$ and $(X+\frac{1}{2}A_1, X+\frac{1}{2}A_2)$ of the other interval of memory size $A_2$ and the center portion $(X-\frac{1}{2}A_1, X+\frac{1}{2}A_1)$ of the other interval of memory size $A_2$.

Consequently, at 540, data for caching to the cache memory is selected to have addresses anywhere within the interval having memory size $A_2$ centered on the block offset "X". For example, upon detection of a cache miss corresponding to "X", and in response to assessing that the instant value of the short-range spatial locality metric is substantially equal to the instant value of the long-range spatial locality metric, and further when the memory size corresponding to the long-range spatial locality metric is $A_2$=128 KB, the data to be cached is selected from the memory interval (X−64 KB, X+64 KB).

Furthermore, in response to detecting the cache miss, an assessment of the short-range and long-range spatial locality metrics results in, at 550, a current value or the short-range spatial locality metric being smaller than a current value of the long-range spatial locality. The small instant value of the short-range spatial locality metric is indicative of a small spatial-density of references to addresses within the interval of memory size $A_1$ centered on the block offset "X", while the large instant value of the long-range spatial locality metric is indicative of a large spatial-density of references to addresses within the other interval of memory size $A_2$ centered on the block offset "X". Because the interval of memory size $A_1$ and the other interval of memory size $A_2$ have a common center, X, the result of the assessment 550 necessarily implies that the number of references to addresses within the edge portions $(X-\frac{1}{2}A_2, X-\frac{1}{2}A_1)$ and $(X+\frac{1}{2}A_1, X+\frac{1}{2}A_2)$ of the other interval of memory size $A_2$ is expected to be larger than the number of references to addresses within the center portion $(X-\frac{1}{2}A_1, X+\frac{1}{2}A_1)$ of the other interval of memory size $A_2$.

Consequently, at 560, data for caching to the cache memory is selected to have addresses within the edge portions $(X-\frac{1}{2}A_2, X-\frac{1}{2}A_1)$ and $(X+\frac{1}{2}A_1, X+\frac{1}{2}A_2)$ of the other interval of memory size $A_2$ centered on the block offset "X". For example, upon detection of a cache miss corresponding to "X", and in response to assessing that the instant value of the short-range spatial locality metric is shorter than the instant value of the long-range spatial locality metric, and further when the respective memory sizes corresponding to the short-range and long range spatial locality metrics are $A_1$=64 KB and $A_2$=128 KB, the data to be cached is selected from the memory intervals (X−64 KB, X−32 KB) and (X+32 KB, X+64 KB).

FIG. 6A shows another example of a method 600 for caching data stored in a storage data system. Method 600 can be implemented, e.g., in the system 200, (i) to determine an amount of data to be pre-fetched in response to detecting a cache miss and (ii) to select an area of the storage system to pre-fetch the determined amount from, relative to an address location associated with the detected cache miss.

At 630, a measure of spatial distribution of accesses to the data storage system is determined (e.g., by the controller 210) based on multiple distinct groups of accesses to the data storage system. An example of an implementation for determining the measure of the spatial distribution performed at 630 is described below in connection with FIG. 6D. Moreover, FIGS. 1A-1H show examples of representations of spatial distributions. For example, the spatial distribution can be represented by one or more spatial localities (e.g., 150) of references to addresses of the storage system, and the measures of the spatial distribution can be represented by spatial locality metrics (e.g., 110) corresponding to the one or more spatial localities, respectively.

At 640, a caching policy used for the data storage system is adjusted (e.g., by the controller 210) based on the determined measure of spatial distribution. Examples of implementations of adjusting the caching policy performed at 640 are described below in connection with FIGS. 6C and 6D.

FIG. 6B shows an optional aspect of the method 600. At 610, the distinct groups of accesses to the data storage system are identified (by the controller 210) based on different reference accesses to the data storage system. For example, the distinct groups of accesses can be identified based on two or more sequences of references to addresses of the data storage system such that a first reference in each of the sequences is associated with an address that is different from an address associated with a first reference in a respective preceding sequence, e.g., $X_n, X_{n+1}, \ldots$ of storage medium 140 as shown in FIGS. 1B and 1D. The distinct groups of accesses identified in this fashion can be used, for example, to determine measures of the spatial distribution at multiple measurement times corresponding to respective times of the first reference in each of the two or more sequences, $X_n, X_{n+1}, \ldots$ Identifying the distinct groups of accesses to the data storage system based on the different reference accesses to the data storage system can include, at 612, determining (e.g., by the controller 210) the different reference accesses to the data storage system based on random number generation. For example, the foregoing two or more sequences of references to addresses of the data storage system can be identified such that a first reference in each of the sequences, $X_n, X_{n+1}, \ldots$, is selected after a random number of references since a last reference in a preceding sequence. Such random sampling can increase measurement accuracy for the spatial distribution measured at the forgoing multiple measurement times.

FIG. 6C shows another optional aspect of the method 600. Specifically, the adjustment of the caching policy performed at 640 can include, at 642, modifying (e.g., by the controller 210) an amount of data pre-fetched from the data storage system, as shown in FIG. 4B. For example, a predetermined amount of data (e.g., "2Δ") is cached from an area of the data storage system adjacent to an address "X" associated with a reference that generated a cache miss, if a measure of the spatial distribution (e.g., 110) exceeds a predetermined threshold. However, another predetermined amount of data (e.g., "Δ") is cached from the same area, if the measure of the spatial distribution (e.g., 110) does not exceed the predetermined threshold.

FIG. 6D shows another optional aspect of method 600. At 620, the distinct groups of accesses to the data storage system are identified (e.g., by the controller 210) based on a same reference access, e.g., corresponding to an address $X_n$ of storage medium 140, as shown in FIG. 1D. In some implementations, the distinct groups of accesses can be identified based on a sequence of references to addresses of the data storage system having a first reference associated with an address $X_n$ of the data storage system 140. The distinct groups of accesses identified in this fashion can be used, for example, to determine measures of respective spatial-components of the spatial distribution (e.g., 112 and 114) at a measurement time corresponding to a time of the first reference (associated with address $X_n$, for instance.) The spatial-components of the spatial distribution (e.g., 112 and 114) can be determined (e.g., by the controller 210) based on respective distances relative to the address corresponding to the first reference in the sequence (e.g., distances $A_1$ and $A_2$ around address $X_n$, as shown in FIG. 1D.)

In some implementations, the distinct groups of accesses can be identified (e.g., by the controller 210) based on two or more sequences of references to addresses of the data storage system, each of the two or more sequences having (i) a common first reference associated with an address of the data storage system (associated with address $X_n$, for instance) and (ii) different numbers of references, $N_1$ and $N_2$, as described in detail in connection with FIG. 1A. The respective distinct groups of accesses identified based on the two or more sequences can be used, for example, to determine measures of respective temporal-components of the spatial distribution at a measurement time corresponding to the first reference (associated with address $X_n$, for instance). The temporal-components can be determined based on respective different numbers of references, $N_1$ and $N_2$, corresponding to the two or more sequences of references.

Identifying the distinct groups of accesses to the data storage system can include, at 622, identifying (e.g., by the controller 210) two distinct groups of accesses to the data storage system based on two different spatial ranges (e.g., distances $A_1$ and $A_2$ around address $X_n$, as shown in FIG. 1D.) For example, two groups of accesses can be identified based on a sequence of references having a first reference associated with an address $X_n$ of the data storage system. The two groups of accesses identified in this fashion can be used, for example, to determine a short-range and a long-range metric of spatial locality (e.g., 112 and 114) at a measurement time corresponding to a time of the first reference (associated with address $X_n$, for instance). The short-range and long-range spatial locality metrics (e.g., 112 and 114) can be determined (e.g., by the controller 210) based on respective short and long distances relative to the address associate with the first reference in the sequence (e.g., distances $A_1$ and $A_2$ around address $X_n$, as shown in FIG. 1D.)

The determination of the measure of spatial distribution performed at 630 can include, at 632, comparing (e.g., by the controller 210) a first number with a second number, where the first number corresponds to one of the two distinct groups, and the second number corresponds to another of the two distinct groups. In some implementations, the short-range and long-range spatial locality metrics (e.g., 112 and 114) determined at 622 can be compared to obtain information about the current spatial distribution of accesses to the data storage system, for example, at a time when a cache miss associated with an address (e.g., X) of the data storage system is detected.

The adjustment of the caching policy performed at 640 can include, at 644, selectively pre-fetching data (e.g., by the controller 210) from different areas of the data storage system (e.g., as shown in FIG. 5B) based on the comparison of the first number with the second number. In some implementations, the caching policy can be adjusted upon detecting a cache miss, for example, by selecting (e.g., by the controller 210) an area of address space to pre-fetch data from, where the area is selected relative to an address associated with the detected cache miss, X, and based on the comparison of current values of the short-range and long-range spatial locality metrics (e.g., 112 and 114.)

A few implementations have been described in detail above, and various modifications are possible. The disclosed subject matter, including the functional operations described in this specification, can be implemented in electronic circuitry, computer hardware, firmware, software, or in combinations of them, such as the structural means disclosed in this specification and structural equivalents thereof, including potentially a program operable to cause one or more data processing apparatus to perform the operations described (such as a program encoded in a computer-readable medium, which can be a memory device, a storage device, a machine-readable storage substrate, or other physical, machine-readable medium, or a combination, of one or more of them).

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A program (also known as a computer program, software, software application, script, or code) can be written in any form of programming language, including compiled or interpreted languages, or declarative or procedural languages, and it can be deployed in any form, including as a standalone program or as a module, component, subroutine, or other unit suitable for use in a computing environment. A program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A program can be deployed to be executed on one computer or on multiple computers that are located at one site or distributed across multiple sites and interconnected by a communication network.

While this specification contains many specifics, these should not be construed as limitations on the scope of what may be claimed, but rather as descriptions of features that may be specific to particular implementations. Certain features that are described in this specification in the context of separate implementations can also be configured in combination in a single implementation. Conversely, various features that are described in the context of a single implementation can also be configured in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations.

Other implementations fall within the scope of the following claims.

The invention claimed is:

1. A system comprising:
a cache device; and
a controller communicatively coupled with a storage medium and with the cache device and configured to interface with a processor or a memory of a computer system, the controller being further configured to:
receive a specified quantity of address references associated with a storage system;
determine a spatial distribution of references to addresses of the storage system based at least in part on the received specified quantity of the address references, wherein to perform a determination of the spatial distribution, the controller is further configured to omit a random quantity of address references between previous determination of the spatial distribution and said determination of the spatial distribution;
combine the determined spatial distribution with the previous determination of the spatial distribution into a spatial locality metric of the storage system; and
output the spatial locality metric to use in caching data from the storage medium to the cache device.

2. The system of claim 1, wherein the cache device includes cache memory.

3. The system of claim 2, wherein the cache device further includes a device controller.

4. The system of claim 1, wherein the spatial locality metric includes a weighted sum of the determined spatial distribution and the previously determined spatial distribution.

5. The system of claim 1, wherein the controller is further configured to:
receive a reference to an address of the storage system, the received address reference corresponding to a given block offset on the storage system;
detect a cache miss for the received address reference in the cache device; and
select, in response to the detection of the cache miss, data relating to the given block offset of the storage system for caching to the cache device in accordance with a current value of the spatial locality metric.

6. The system of claim 5, wherein the selected data for caching to the cache device includes (i) a specified amount of data from contiguous memory adjacent to the given block offset if the current value of the spatial locality metric is between a first value and a second value larger than the first value, (ii) more than the specified amount of data from contiguous memory adjacent to the given block offset if the current value of the spatial locality metric is larger than the second value, and (iii) less than the specified amount of data from contiguous memory adjacent to the given block offset if the current value of the spatial locality metric is less than the first value.

7. The system of claim 6, wherein the selected data for caching to the cache device is zero if the current value of the spatial locality metric is less than the first value.

8. The system of claim 6, wherein the selected data for caching to the cache device includes twice the specified amount of data from contiguous memory adjacent to the given block offset if the current value of the spatial locality metric is larger than the second value.

9. The system of claim 5, wherein the determined spatial distribution on the storage system includes a first fraction of the received specified quantity of the address references that are within a first distance from a block offset of a first address reference of the received specified quantity of the address references.

10. The system of claim 9, wherein the determined spatial distribution on the storage system further includes a second fraction of the received specified quantity of the address references that are within a second distance from the block offset of the first address reference of the received specified quantity of the address references, the second distance being longer than the first distance, such that the determined spatial distribution has a short-range component of the spatial distribution representing a ratio of the first fraction to the first, shorter distance and a long-range component of the spatial distribution representing another ratio of the second fraction to the second, longer distance, and wherein the spatial locality metric includes short-range and long-range spatial locality metrics corresponding to respective short-range and long-range components of the spatial distribution.

11. The system of claim 10, wherein the selected data for caching to the cache device corresponds to (i) addresses located less than the first distance from the given block offset if a current value of the short-range spatial locality metric is larger than a current value of the long-range spatial locality metric, (ii) addresses located less than the second distance from the given block offset if current values of the short-range and long-range spatial locality metrics are substantially equal, and (iii) addresses located between the second and first distances from the given block offset if a current value of the short-range spatial locality metric is smaller than a current value of the long-range spatial locality metric.

12. A method performed by a data processing apparatus, the method comprising:

communicating with a storage system and with a cache device;

receiving a specified quantity of address references associated with the storage system;

determining a spatial distribution of references to addresses of the storage system based at least in part on the received specified quantity of the address references, wherein said determining the spatial distribution comprises omitting a random quantity of address references between a previously determined spatial distribution and the determined spatial distribution;

combining the determined spatial distribution with the previously determined spatial distribution into a spatial locality metric of the storage system; and outputting the spatial locality metric to be used in caching data from the storage system to the cache device.

13. The method of claim 12, wherein the cache device includes cache memory.

14. The method of claim 13, wherein the cache device further includes a device controller.

15. The method of claim 12, wherein the combining comprises calculating a weighted sum of the determined spatial distribution and the previously determined spatial distribution.

16. The method of claim 12, further comprising:

receiving a reference to an address of the storage system, the received address reference corresponding to a given block offset on the storage system;

detecting a cache miss for the received address reference in the cache device; and selecting, in response to the detected cache miss, data relating to the given block offset of the storage system to be cached to the cache device in accordance with a current value of the spatial locality metric.

17. The method of claim 16, wherein the selected data to be cached to the cache device includes (i) a specified amount of data from contiguous memory adjacent to the given block offset if the current value of the spatial locality metric is between a first value and a second value larger than the first value, (ii) more than the specified amount of data from contiguous memory adjacent to the given block offset if the current value of the spatial locality metric is larger than the second value, and (iii) less than the specified amount of data from contiguous memory adjacent to the given block offset if the current value of the spatial locality metric is less than the first value.

18. The method of claim 17, wherein the selected data to be cached to the cache device is zero if the current value of the spatial locality metric is less than the first value.

19. The method of claim 17, wherein the selected data to be cached to the cache device includes twice the specified amount of data from contiguous memory adjacent to the given block offset if the current value of the spatial locality metric is larger than the second value.

20. The method of claim 16, wherein the determined spatial distribution on the storage system includes a first fraction of the received specified quantity of the address references that are within a first distance from a block offset of a first address reference of the received specified quantity of the address references.

21. The method of claim 20, wherein the determined spatial distribution on the storage system further includes a second fraction of the received specified quantity of the address references that are within a second distance from the block offset of the first address reference of the received specified quantity of the address references, the second distance being longer than the first distance, such that the determined spatial distribution has a short-range component of the spatial distribution representing a ratio of the first fraction to the first, shorter distance and a long-range component of the spatial distribution representing another ratio of the second fraction to the second, longer distance, and wherein the spatial locality metric includes short-range and long-range spatial locality metrics corresponding to respective short-range and long-range components of the spatial distribution.

22. The method of claim 21, wherein the selected data to be cached to the cache device corresponds to
  (i) addresses located less than the first distance from the given block offset if a current value of the short-range spatial locality metric is larger than a current value of the long-range spatial locality metric,
  (ii) addresses located less than the second distance from the given block offset if current values of the short-range and long-range spatial locality metrics are substantially equal, and
  (iii) addresses located between the second and first distances from the given block offset if a current value of the short-range spatial locality metric is smaller than a current value of the long-range spatial locality metric.

* * * * *